(12) United States Patent  (10) Patent No.: US 8,564,799 B2
Grodsky et al.  (45) Date of Patent: Oct. 22, 2013

(54) PRINT QUALITY VALIDATION OF PRINT JOBS USING BITMAPPED IMAGE

(75) Inventors: Gilbert A. Grodsky, Burbank, CA (US); Richard T. Horn, Claremont, CA (US)

(73) Assignee: Xerox Corporation, Norwalk, CT (US)

( * ) Notice: Subject to any disclaimer, the term of this patent is extended or adjusted under 35 U.S.C. 154(b) by 689 days.

(21) Appl. No.: 12/720,741

(22) Filed: Mar. 10, 2010

(65) Prior Publication Data

US 2011/0222106 A1  Sep. 15, 2011

(51) Int. Cl.
G06K 15/00 (2006.01)

(52) U.S. Cl.
USPC .......... 358/1.14; 358/1.15; 358/1.1; 358/462; 382/112; 399/16; 399/15; 340/5.2; 340/5.8; 340/5.86

(58) Field of Classification Search
None
See application file for complete search history.

(56) References Cited

U.S. PATENT DOCUMENTS

| | | | |
|---|---|---|---|
| 3,795,894 A * | 3/1974 | Klemt | 382/223 |
| 5,075,875 A * | 12/1991 | Love et al. | 358/1.18 |
| 6,002,844 A * | 12/1999 | Kishida et al. | 358/1.15 |
| 6,032,004 A | 2/2000 | Mirabella, Jr. et al. | |
| 6,498,655 B1 * | 12/2002 | Brooks et al. | 358/1.12 |
| 6,674,889 B1 * | 1/2004 | Takayama | 382/149 |
| 7,076,101 B2 * | 7/2006 | Chung et al. | 382/218 |
| 7,267,274 B2 | 9/2007 | Goetz | |
| 7,267,421 B2 | 9/2007 | Asauchi et al. | |
| 7,587,079 B2 * | 9/2009 | Marlett et al. | 382/139 |
| 2003/0090699 A1 * | 5/2003 | Meyerhofer et al. | 358/1.14 |
| 2007/0165267 A1 * | 7/2007 | Fransazov | 358/1.15 |
| 2009/0001661 A1 | 1/2009 | Klein et al. | |
| 2009/0027712 A1 | 1/2009 | Sone | |
| 2009/0190126 A1 | 7/2009 | Martinez | |

* cited by examiner

Primary Examiner — Paul F Payer
(74) Attorney, Agent, or Firm — Gibb & Riley, LLC

(57) ABSTRACT

A method and apparatus capture bitmapped images of pages of a print job that have been raster image processed while being printed by a printing device and collect electronic image data from at least one predetermined area of the bitmapped images of the pages using a computerized device. In addition, the method and apparatus capture at least one scanned image from the predetermined area of sheets of media printed by the printing device according to the print job, using an optical imaging device operatively connected to the computerized device and compare the scanned image to the electronic image data to validate whether the print job printed correctly.

20 Claims, 2 Drawing Sheets

PRINT QUALITY VALIDATION OF PRINT JOBS USING BITMAPPED IMAGE

BACKGROUND AND SUMMARY

Embodiments herein generally relate to printing devices and more particularly to a printing device and method that uses optical character recognition of bitmap images to validate print jobs.

The embodiments herein relate to how to use a printer to collect data within a document during the print process to validate each page regardless of original print stream format.

When printing an item, electronic files that contain instructions on how to construct and print a document are sent to a printer. These instructions are interpreted by the printer and page images are composed and then used to drive the printing mechanism to image each page on the transfer media. The final printed image is therefore impacted primarily by the instructions on how it should be constructed and the performance quality of the printing mechanism and transfer process. Quality control of the printed output can be performed by manual inspection after the job has completed printed. However, this approach misses problems and causes considerable expense in handling for inspection and reprinting if actual print data varied or changed during the overall process.

One embodiment herein provides a method that captures bitmapped images of pages of a print job that have been raster image processed by a digital front end of a printing device (while they are being printed by the printing device). The electronic instance of the bitmapped images are captured from the printing device's buffer using a computerized device, potentially positioned within the printing device. The computerized device collects electronic image data. The embodiments herein also capture scanned images or sensed data from the predetermined area of sheets of media printed by the printing device according to the print job, using an optical imaging or sensing device operatively connected to the computerized device, and compare within a tolerance the scanned images to the electronic image data (potentially on a print density, other derived metric or pixel-by-pixel basis) to validate whether the print job printed within an acceptable statistical standard.

While the foregoing describes a method embodiment, a device embodiment is also presented herein. Such a printing device embodiment comprises a computerized device that captures bitmapped images of pages of a print job that have been raster image processed while being printed by the printing device. The computerized device collects electronic image data from the bitmapped images of the pages. The printing device includes an optical imaging device operatively connected to the computerized device. Embodiments herein capture scanned images from the predetermined area of sheets of media printed by the printing device according to the print job, using the optical imaging device, and compare the scanned images to the electronic image data to validate whether the print job printed correctly.

The method and apparatus embodiments herein produce an audit report based on the comparing process using the computerized device and output the audit report from the printing device. The processes of capturing the bitmapped images, collecting the electronic image data, capturing the scanned images, and comparing the scanned images to the electronic image data are all performed on the print job by the computerized device while the printing device is printing the print job. In addition, a light source can be used to illuminate the sheets while the scanned images are being captured. Further, the "at least one predetermined area" of the bitmapped images is less than all of each bitmapped image, but is the same area on each of the bitmapped images.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, quality control of the printed output is an important issue. Print stream languages use different artifacts to pass information around the actual print process and a stable printer-independent and printer-submission-language-independent solution to tracking such data is provided by the embodiments herein.

The embodiments herein support the real time acquisition of information from the constructed print image to statistically compare with that acquired by a suitable physical sensor mounted along the paper path. The embodiments herein sample, in real time, a selected area of the bitmapped image produced for each print image and process the output for comparison with expected values.

Instead of using stored static values, with embodiments herein the processed image information out is compared with the processed data collected by a sensor and by a suitable illuminator and detector mounted along the paper path. Thus, as an example, a computed value from the bitmap in the page image buffer is compared to a measured value from the detector, with the difference representing the measure of print quality.

Figure 1:
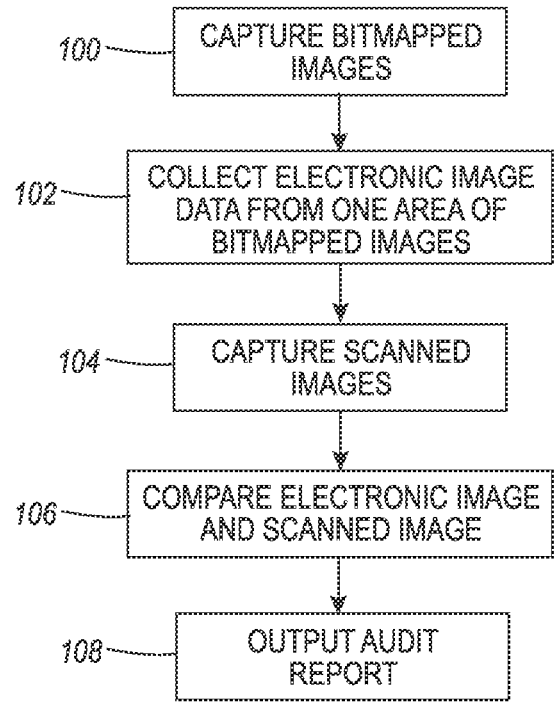
FIG. 1 is a flow diagram illustrating embodiments herein.

FIG. 1 is a flowchart illustrating one method embodiment herein that, in item 100, captures bitmapped images of pages of a print job that have been raster image processed by a digital front end of a printing device (while they are being printed by the printing device). The bitmapped images are captured from the printing device's buffer using a computerized device, potentially positioned within the printing device. In other words, the bitmapped images contain information on a pixel-by-pixel basis which, when combined, create an electronic form of one color plane of an image. If the printer prints in color, then there will be more than one buffer for each page. Depending on the application, our software and sensor could process one or more color planes.

This electronic form of the image is different than an image that is physically printed on the sheet of media and that is observable by the user. To the contrary, the electronic form of the image that is obtained from the printing device's buffer is not physically observable and is instead stored as electronic signals within the printing device's computerized memory (storage medium).

In item 102, the computerized device collects electronic image data (potentially one or more predetermined areas) of the bitmapped images of the pages. As shown below in greater detail in FIG. 3, the "at least one predetermined area" of the bitmapped images can be less than all of each bitmapped image, but is generally the same area on each of the bitmapped images. For example, the selected area could be the lower right quarter of the page, a portion of the third line of the page, the square inch of the specific X-Y location on the page, etc.

The embodiments herein also capture scanned images (again, potentially from the predetermined areas) of sheets of media after they are printed by the printing device (according to the print job) in item 104 using an optical imaging device that is operatively connected to the computerized device. In addition, a light source can be used to illuminate the sheets while the scanned images are being captured in item 104. Then, in item 106, the embodiments herein compare the scanned images to the electronic image data (potentially on a density or pixel-by-pixel basis) to validate whether the print job printed correctly.

In item 108, the embodiments herein produce an audit report based on the comparing process using the computerized device and output the audit report from the printing device. The audit report will identify any inconsistencies between the electronic image data and the scanned images.

The processes of capturing the bitmapped images (100), collecting the electronic image data (102), capturing the scanned images (104), and comparing the scanned images to the electronic image data (106) are all performed on the print job by the computerized device while the printing device is printing the print job.

Figure 2:
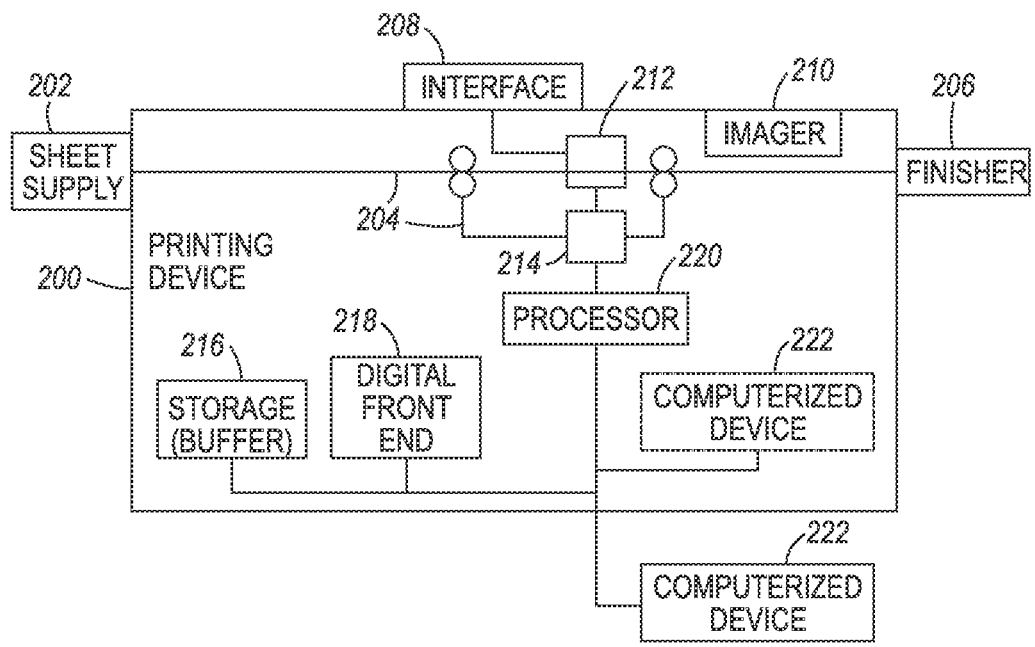
FIG. 2 is a side-view schematic diagram of a device according to embodiments herein.

A printing device 200 embodiment is illustrated in FIG. 2. A sheet supply feeds sheets of media along a media path 204 to one or more printing/marking engines 212, 214. The media path 204 can include at least one feedback loop for multiplexing and multiple pass printing. After printing, the media path 204 feeds the printed sheets by an optical imaging device (imager) 210, and to an output tray, sorter, or finisher 206.

The optical image sensors 210 can be mounted in any appropriate location. For example, the optical image sensors can be mounted in fixed locations with respect to the registration edge of the sheet of printed media (e.g. 1", 3" and 6" from the registration edge). Such optical image sensors 210 are well-known to those ordinarily skilled in the art and are readily available from suppliers such as Xerox Corporation, Norwalk, Conn. Therefore a detailed discussion of such sensors is not included herein. The details of printers, printing engines, etc., are also well-known by those ordinarily skilled in the art and are discussed in, for example, U.S. Pat. No. 6,032,004, the complete disclosure of which is fully incorporated herein by reference.

Further, the printing device 200 includes a storage device 216 that comprises any form of electronic storage media (capacitor-based, magnetic media-based, optical, etc.) whether now known or developed in the future. The storage device 216 not only acts as a buffer for the bitmaps, it also stores programs of instructions that are executed by the processor 218. These programs of instructions cause the printing device 200 to perform the necessary actions to cause printing operations to occur and also cause the printing device to perform the various methods that are described herein.

An interface 208 (which can be a graphic user interface, computer network interface, etc.) receives a stream of print jobs that are processed by the digital front end (DFE) processor 218. In the printer's digital front end 218, after the each page is decomposed into bitmap(s), the processor 220 process the bitmapped information and provides operator selectable applications to apply to the data. The user interface 208 also allows the user to select and/or create and save a per page template that can be used to determine the sample areas.

The digital front end 218 converts the pages within the print stream (rasterizes the images in a process known as raster image processing (RIP)) into pixel-by-pixel information that makes up a bitmap of pixel information that is used by the printing engines 212, 214 to actually print the pages. Each pixel tells the printing engines 212, 214 exactly where to make marks on the printed pages. Such bitmapped images can be temporarily stored in the buffer 216 to allow the printing engines 212, 214 to operate more efficiently. The embodiments herein take advantage of the storage of the bitmapped images in the buffer 216 and compare such electronic image data to the scanned image to determine if the print job was printed correctly.

The embodiments herein use a computerized device 222 that captures the bitmapped images of pages of the print job that have been raster image processed while being printed by the printing device 200. Note that, as illustrated in FIG. 2, the computerized device 222 can be located within the printing device 200 or can be a separate device that is operatively connected to (directly or indirectly connected to) the printing device 200. The computerized device 222 collects electronic image data from all of (or at least one predetermined area of) the bitmapped images of the pages. The computerized device 222 compares the electronic image data to the scanned image to validate whether said print job printed correctly.

The optical image sensors 210 that are used can be very expensive and sophisticated (high resolution) or can be relatively inexpensive and unsophisticated (low resolution). If highly sophisticated and expensive sensors are utilized, a pixel-by-pixel analysis can be performed between the scanned image and the electronic image data.

To the contrary, one or more relatively inexpensive, low resolution sensors can be utilized as the optical image sensors 210. If such relatively low resolution sensors 210 are utilized, for each sheet of paper that passes by the sensors, the embodiments herein can calculate an average print density for that swath of the image based on the sensor readings. This can be done by the sensor 210 itself, or by having the computerized device 222 average multiple readings as the printed sheets of media pass under the sensor. For each page, after the page is decomposed into bitmap(s), the computerized device 222 can calculate the expected density for the same swath of the image expected to be read by each sensor. The sensor may already be part of the printer, say a calibration device, that can be re-purposed for this application. With the sensing device (a) its measured value can be predicted by analyzing the bitmap data and (b) the device is sensitive to print quality.

In addition, in the user interface 208 the user can set a tolerance (or sensitivity) to convert an expected reading to an acceptable range for each sensor 210 regardless of the actual property that the sensor measures. Alternatively, these values could be fixed and not part of a user interface. When printing a job, the embodiments can compare, on a page basis, the density or other property measured by the sensors 210 to the expected range and issue a failing audit report or stop the printer if the numbers are out of range. The possible reasons for a stoppage include unacceptable print quality, bad image registration, etc.

When printing documents (especially those of monetary value, intellectual value, security value, personal information value, etc.), there is often a need to know that the document was printed as close as possible to the requested page image from the submitted electronic instructions.

Historically, for page verification, this is done by printing a sequential bar code on the sheets of paper and then reading the bar code with an external scanning/reading device. However, printing items such as a barcode on each sheet can be technically difficult to add to existing print streams and aesthetically displeasing to many customers. Further, the barcode reader made periodically required customer adjustment, sometimes from job to job.

To the contrary, the embodiments herein provide a print quality system that does not impose a special item such as a barcode be printed on the page. Further, the systems and methods described herein work with any unmodified customer print job (no extra barcodes), work with any supported print stream, and do not require hardware customer adjustment required or item such as an optical scanner.

Figure 3:
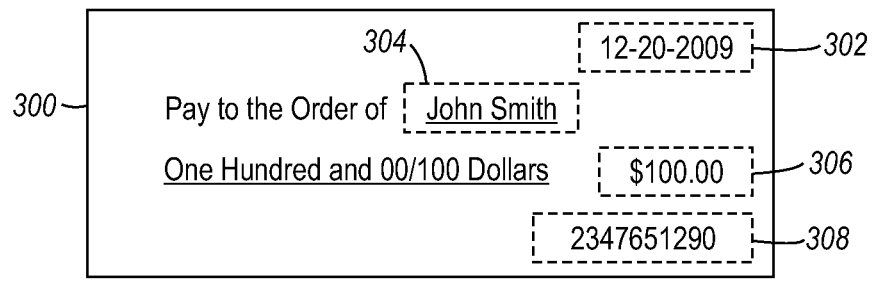
FIG. 3 is a schematic diagram of a bitmap image according to embodiments herein.

For example, as shown in FIG. 3, the bitmapped image 300 includes many dark pixels and many light pixels which make up the image that is transferred to a sheet of media. With embodiments herein, images can be collected from all areas or many distinct areas 302, 304, 306, 308 according to user preferences (based on user input that defines the areas from which the images are obtained). For example, a user may want to concentrate the validation process on specific information such as the name 304, amount 306, bank number 308, etc.

While FIG. 3 illustrates a check or negotiable instrument, those ordinarily skilled in the art would understand that the embodiments here are not limited to the type of document they can process. While the embodiments herein work well with all critical documents, such as checks, stocks, bonds, insurance policies, legal documents, etc., they also work equally well with publications, mailings, papers, handouts, photographs, and all other types of printed items.

Thus, with the embodiments herein, the actual decomposed print image becomes the data source that is compared to the scanned image instead of any pre-established values, and the data collection is therefore independent of any support print stream. Also, the data is collected in real time.

The embodiments herein can work with any unmodified customer print job and have minimal hardware requirements. The data can be used to halt the print flow in case of error, or to issue an alert or audit report.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The embodiments herein can encompass embodiments that print in color, monochrome, or handle color or monochrome image data. All foregoing embodiments are specifically applicable to electrostatographic and/or xerographic machines and/or processes.

It is appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
  capturing, from a printing device's memory buffer, by a computerized device, bitmapped images of pages of a print job that have been raster image processed while being printed by said printing device;
  collecting derived data from said bitmapped images of said pages using said computerized device;
  capturing at least one scanned image as sensed data from sheets of media printed by said printing device according to said print job, using an optical sensing device operatively connected to said computerized device; and
  comparing pixels within said sensed data to corresponding pixels within said derived data to validate whether said print job printed correctly.

2. The method according to claim 1, further comprising producing an audit report based on said comparing process using said computerized device and outputting said audit report from said printing device.

3. The method according to claim 1, said capturing of said bitmapped images, said collecting, said capturing of said scanned image, and said comparing being performed on said print job by said computerized device while said printing device is printing said print job.

4. The method according to claim 1, said capturing of said scanned image further comprising illuminating said sheets using a light source operatively connected to said printing device.

5. The method according to claim 1, said comparing said sensed data to said derived data comprising comparing a print density of said derived data to a print density of said sensed data.

6. A method comprising:
  capturing, from a printing device's memory buffer, by a computerized device, electronic instances of bitmapped images of pages of a print job that have been raster image processed while being printed by said printing device;
  collecting electronic image data from at least one predetermined area of said bitmapped images of said pages using said computerized device;
  capturing at least one scanned image from a corresponding area of sheets of media printed by said printing device according to said print job, using an optical imaging device operatively connected to said computerized device, said corresponding area of said sheets of media corresponding to said predetermined area of said bitmapped images; and
  comparing pixels within said scanned image to corresponding pixels within said electronic image data to validate whether said print job printed correctly.

7. The method according to claim 6, further comprising producing an audit report based on said comparing process using said computerized device and outputting said audit report from said printing device.

8. The method according to claim 6, said capturing of said bitmapped images, said collecting, said capturing of said scanned image, and said comparing being performed on said print job by said computerized device while said printing device is printing said print job.

9. The method according to claim 6, said capturing of said scanned image further comprising illuminating said sheets using a light source operatively connected to said printing device.

10. The method according to claim 6, said at least one area of said bitmapped images comprising less than all of each bitmapped image and comprising the same area on each of said bitmapped images.

11. A printing device comprising:

a computerized device capturing from a memory buffer of said printing device, bitmapped images of pages of a print job that have been raster image processed while being printed by said printing device, said computerized device collecting image data from said bitmapped images of said pages using said computerized device; and an optical imaging device operatively connected to said computerized device, said optical imaging device capturing at least one scanned image from sheets of media printed by said printing device according to said print job, said computerized device comparing pixels within said scanned image to corresponding pixels within said image data to validate whether said print job printed correctly.

12. The printing device according to claim 11, said computerized device producing an audit report based on said comparing process and said printing device outputting said audit report.

13. The printing device according to claim 11, said capturing of said bitmapped images, said collecting, said capturing of said scanned image, and said comparing being performed on said print job by said computerized device while said printing device is printing said print job.

14. The printing device according to claim 11, further comprising a light source operatively connected to said printing device, said light source illuminating said sheets while said optical imaging device captures said scanned image.

15. The printing device according to claim 11, said comparing of said scanned image to said image data comprising comparing a print density of said image data from said bitmapped images to a print density of said scanned image from sheets of media printed by said printing device.

16. A computer storage medium, readable by a computer, tangibly embodying instructions executable by said computer to perform a method comprising:

capturing, from a printing device's memory buffer, by a computerized device, bitmapped images of pages of a print job that have been raster image processed while being printed by said printing device;

collecting image data from said bitmapped images of said pages using said computerized device;

capturing at least one scanned image from sheets of media printed by said printing device according to said print job, using an optical imaging device operatively connected to said computerized device; and comparing pixels within said scanned image to corresponding pixels within said image data to validate whether said print job printed correctly.

17. The computer storage medium according to claim 16, said method further comprising producing an audit report based on said comparing process using said computerized device and outputting said audit report from said printing device.

18. The computer storage medium according to claim 16, said capturing of said bitmapped images, said collecting, said capturing of said scanned image, and said comparing being performed on said print job by said computerized device while said printing device is printing said print job.

19. The computer storage medium according to claim 16, said capturing of said scanned image further comprising illuminating said sheets using a light source operatively connected to said printing device.

20. The computer storage medium according to claim 16, said comparing of said scanned image to said image data comprising comparing a print density of said image data from said bitmapped images to a print density of said scanned image from sheets of media printed by said printing device.

* * * * *